(12) United States Patent
Jagannath et al.

(10) Patent No.: US 12,369,038 B2
(45) Date of Patent: Jul. 22, 2025

(54) RADIO FREQUENCY FINGERPRINTING USING ATTENTIONAL MACHINE LEARNING

(71) Applicant: Andro Computational Solutions, LLC, Rome, NY (US)

(72) Inventors: Anu Jagannath, Oriskany, NY (US); Jithin Jagannath, Oriskany, NY (US); Andrew Louis Drozd, Rome, NY (US)

(73) Assignee: ANDRO COMPUTATIONAL SOLUTIONS, LLC, Rome, NY (US)

( * ) Notice: Subject to any disclaimer, the term of this patent is extended or adjusted under 35 U.S.C. 154(b) by 406 days.

(21) Appl. No.: 18/057,830

(22) Filed: Nov. 22, 2022

(65) Prior Publication Data

US 2023/0164572 A1 May 25, 2023

Related U.S. Application Data

(60) Provisional application No. 63/264,390, filed on Nov. 22, 2021.

(51) Int. Cl.
*H04W 12/79* (2021.01)
*H04B 1/04* (2006.01)

(52) U.S. Cl.
CPC .......... *H04W 12/79* (2021.01); *H04B 1/0483* (2013.01)

(58) Field of Classification Search
CPC .............................. H04W 12/79; H04B 1/0483
See application file for complete search history.

(56) References Cited

U.S. PATENT DOCUMENTS

| | | | |
|---|---|---|---|
| 9,692,529 B1 * | 6/2017 | Music | H04B 17/101 |
| 2004/0166818 A1 * | 8/2004 | Karlsson | H04W 99/00 340/5.74 |
| 2022/0217619 A1 * | 7/2022 | Robinson | H04W 48/16 |

* cited by examiner

*Primary Examiner* — Duc C Ho
(74) *Attorney, Agent, or Firm* — Hoffman Warnick LLC (57) ABSTRACT

Embodiments of the disclosure provide a sensitivity enhancing radio frequency identification technique using machine learning. A method according to the disclosure includes obtaining an input signal associated with a radio frequency (RF) transmission; separately extracting spatial domain features, time-frequency domain features, and temporal domain features from the input signal; processing the spatial domain features, time-frequency domain features, and temporal domain features to generate an attentional vector; and predicting at least one descriptor for an emitter of the RF transmission based on the attentional vector.

20 Claims, 4 Drawing Sheets

RADIO FREQUENCY FINGERPRINTING USING ATTENTIONAL MACHINE LEARNING

This application claims priority to provisional application, Ser. No. 63/264,390 filed on Nov. 22, 2021, entitled SENSITIVITY ENHANCING RADIO FREQUENCY IDENTIFICATION TECHNIQUE USING MACHINE LEARNING, the contents of which is hereby incorporated by reference.

BACKGROUND

1. Technical Field

The present disclosure relates to communication systems. Specifically, embodiments of the disclosure provide a methodology for radio frequency (RF) fingerprinting using deep learning techniques.

2. Background Art

In the context of wireless radio frequency (RF) communications, "fingerprinting" involves identifying hardware intrinsic characteristics of an emitter device that get embedded into a transmitted waveform. Due to the imperfections introduced in the manufacturing process, components of an RF circuit such as the power amplifier (PA), low noise amplifier (LNA), clock circuits, and local oscillators (LO), etc., introduce IQ imbalance, clock skew, out of band (OOB) spurious leakage, etc., any of which may differ across the devices even by the same manufacturer. RF fingerprinting accordingly can be used in any number of applications where identifying an emitter device is required, e.g., security applications to identify prohibited or unknown devices.

SUMMARY

The illustrative aspects of the present disclosure are designed to solve the problems herein described and/or other problems not discussed.

Aspects of the disclosure provide a method comprising: obtaining an input signal associated with a radio frequency (RF) transmission; separately extracting spatial domain features, time-frequency domain features, and temporal domain features from the input signal; processing the spatial domain features, time-frequency domain features, and temporal domain features to generate an attentional vector; and predicting at least one descriptor associated with an emitter of the RF transmission based on the attentional vector.

Further aspects of the disclosure provide a system, including: a memory; and a processor configured to identify a fingerprint from an RF transmission according to a process that includes: obtaining an input signal associated with the RF transmission; separately extracting spatial domain features, time-frequency domain features, and temporal domain features from the input signal; processing the spatial domain features, time-frequency domain features, and temporal domain features to generate an attentional vector; and predicting at least one descriptor for an emitter of the RF transmission based on the attentional vector.

Additional aspects of the disclosure provide a system having: a sensor configured to capture radio frequency RF transmissions having different communication protocols from a set of emitters in an operational environment and generating a set of IQ samples for a particular RF transmission; and a computing device having a memory and a processor configured to identify a fingerprint of the RF transmission according to a process that includes: separately extracting spatial domain features, time-frequency domain features, and temporal domain features from the set of IQ samples; processing the spatial domain features, time-frequency domain features, and temporal domain features to generate an attentional vector; and identifying the emitter of the particular RF transmission by submitting the attentional vector to a neural network.

The illustrative aspects of the present disclosure are designed to solve the problems herein described and/or other problems not discussed.

BRIEF DESCRIPTION OF THE DRAWINGS

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Embodiments of the disclosure provide a system and methodology for radio frequency (RF) fingerprinting whereby an emitter device ("emitter") and wireless protocol of a sensed waveform is predicted by a multi-task learning (MTL) deep neural network architecture. In this case, a deployed neural network will elucidate the RF spectrum in terms of the operating wireless devices in the operational environment. Embodiments of the disclosure include an MTL architecture that performs multiple identification tasks with a single neural network model as opposed to single model per task.

An architecture according to the disclosure uses a machine learning model (e.g., a deep learning neural network) trained on a library of training data, including a comprehensive and accurately annotated data set with the intended waveforms. This may include a signal data set representing emissions from emitters to train and test the model. Such waveforms could be representative of transmissions from various devices in an operational environment. Embodiments of the disclosure can be implemented for any type of RF wireless communications device, including emitters for wireless fidelity (Wi-Fi), Bluetooth, cellular signals, Zigbee, and/or other wireless communications hardware. Examples of such devices include, e.g., cellphones, Internet-of-Things (IoT) devices, laptops, smart devices, etc. It is understood that any conceivable wireless communications device capable of emitting a detectable signal may be used in various embodiments or implementations.

Figure 1:
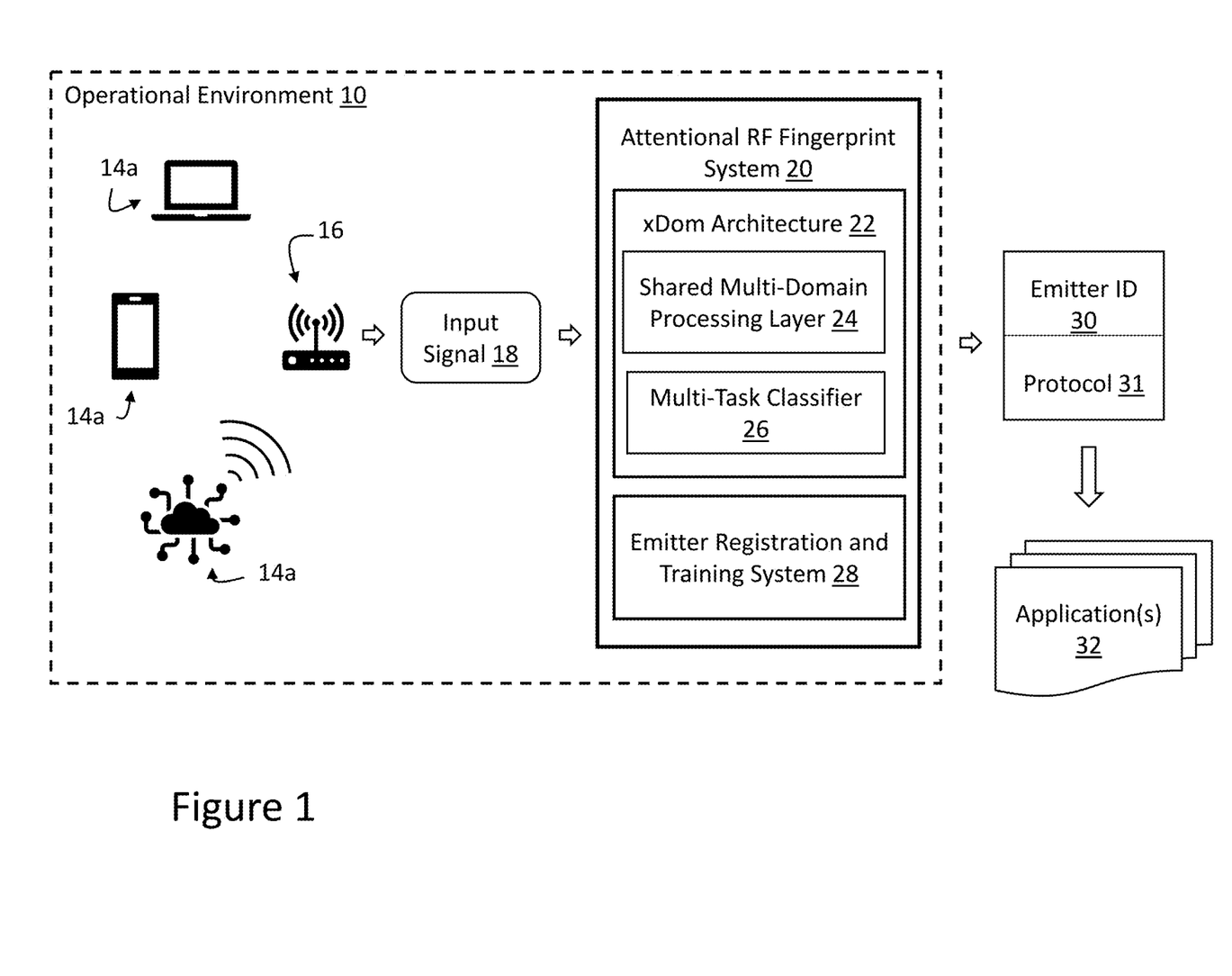
FIG. 1 depicts an illustrative emitter operational environment having an attentional radio frequency (RF) fingerprint system according to embodiments.

Referring to FIG. 1, an operational environment 10 is shown that includes a number of emitters 14a, 14b, 14c, each capable of transmitting the same or different types of RF signals. For example, the emitters may include a laptop 14a capable of emitting a Bluetooth or WiFi signal, a cellphone 14b capable of emitting a cellular signal, and a IoT device 14c capable of emitting a Zigbee signal. Within the operational environment 10 is a receiver system 16, such as a spectrum sensing radio, capable of capturing an emitted signal from any one of the emitters 14a, 14b, 14c and providing an input signal 18 to attentional RF fingerprint system 20. In certain aspects, receiver system 16 may be configured to collect only one single unique signal at a time, or configured to capture and separate multiple signals received simultaneously. Regardless, receiver system 16 converts a received signal into the input signal 18, which includes a set of IQ (i.e., quadrature) samples. IQ samples generally include pairs of unequally spaced or offset heterodyned samples taken at a sample rate (per pair) frequency related to the frequency bandwidth of interest, often well below the actual RF frequency of the signal of interest. Technologies for generating IQ samples from RF signals are well understood in the art and are therefore described in detail herein. In an illustrative embodiment, the input signal 18 contains 1024 IQ samples, although fewer or more samples could be included.

Attentional RF fingerprint system (i.e., "fingerprint system") 20 includes a cross-domain multi-task (xDom) architecture 22 which provides a deep learning model for processing the input signal 18 to perform RF fingerprinting. Fingerprinting generally entails determining one or more descriptors, including an identification (ID) 30 of the emitter that generated the RF signal and a wireless protocol 31 that was utilized. xDom architecture 22 generally includes: (1) a shared multi-domain processing layer (shared layer) 24 that processes the input signal 18 and extracts and processes (e.g., concatenates) feature maps from three domains into an attentional vector; and (2) a multi-task classifier 26 (e.g., a neural network) that evaluates the attentional vector and determines the emitter ID 30 and protocol 31. In addition, fingerprint system 20 also includes an emitter registration and training system 28 through which emitters 14a, 14b, 14c within the operational environment 10 can be registered, and their respective fingerprints can be used to train system 20.

In certain cases, the resulting emitter ID 30 and protocol 31 can be utilized as input to one or more applications 32. Illustrative applications 32 may include, e.g., security systems designed to recognize devices with an operational environment such as a facility, building, secure location, etc.; gaming systems; spectrum sharing services, multifactor authentication systems, etc.

Figure 2:
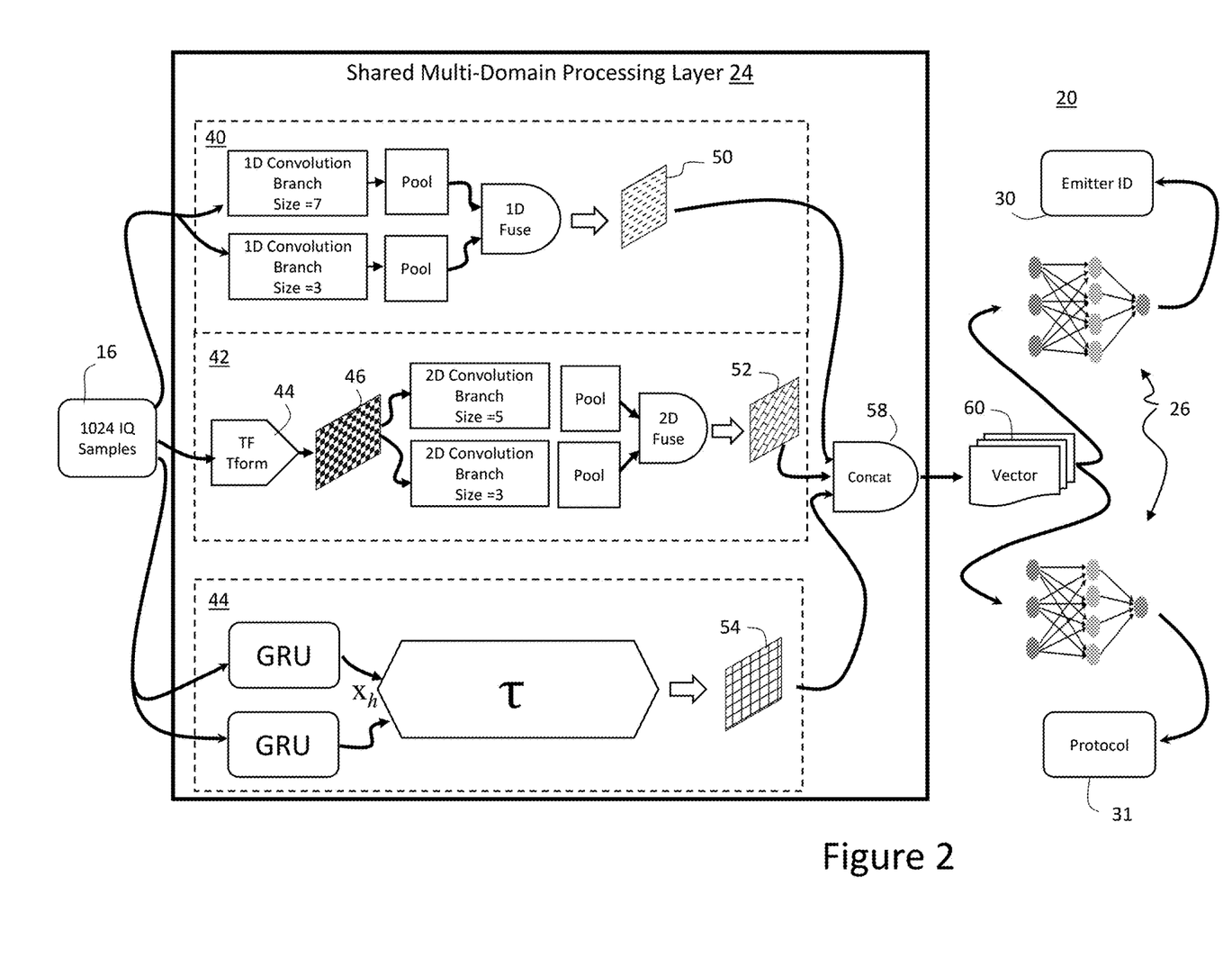
FIG. 2 depicts an illustrative attentional RF fingerprint system according to embodiments.

FIG. 2 depicts an illustrative fingerprint system 20 in further detail. In this case, input signal 18 includes 1024 complex IQ samples in a 2D tensor format such that they are arranged as rows of a 2D tensor. The input signal 18 is processed in three separate domains by shared layer 24 to provide three domains of feature extraction. The three processing domains include: spatial domain processing 40, time frequency (TF) domain processing 42, and temporal domain processing 44, which extract a spatial domain feature map 50, a time frequency domain feature map 52, and a temporal domain feature map 52, respectively. The resulting feature maps 50, 52, 54 are processed, e.g., concatenated by a concatenation system 58, to generate an xDom attentional vector 60, which is input into multi-task classifier 26 to predict one or more descriptors, e.g., an emitter ID 30 and protocol 31.

In this illustrative embodiment, spatial domain processing 40 generally includes a pair of parallel one dimensional (1D) convolutional filter banks or channels that perform convolution on the input signal 18. In this example, the top branch uses convolution with a kernel size of 7 and the bottom branch uses a kernel size of 3. A pooling operation is applied to each, and the resulting pools are fused together using 1D fusing to generate the resulting spatial domain feature map 50. The 1D convolutional filter banks accordingly process the IQ input as a 2-channel input to extract the local temporal correlations from the two channels.

Time frequency domain processing 42 first applies a time-frequency transformation 44 on the input signal 18, which may for example include a runtime short-time Fourier transform (STFT) block that maps the input signal 18 to a two-dimensional (2D) TF map 46. In one approach, STFT includes a 128-point fast Fourier transform (FFT) operation that produces a 65×1025 TF map 46, which is split into its component magnitude and phase representations for further processing. It is understood however, that other time-frequency transformations could be utilized (e.g., wavelet transforms, bilinear distribution function transforms, etc.). In this case, a pair of parallel 2D convolutional filter banks or channels perform convolution on the TF map 46. Each of the 2D convolutional channels span across the 65×1025 2D TF map 46 to extract the prominent spatial TF features. The magnitude and phase of the TF map 46 are separately processed in each of the 2D convolution branches for a comprehensive representation. In this example, the top convolution branch includes a kernel size of 5 and the bottom branch includes a kernel size of 3. The resulting pool of each are fused using a 2D fusing process to generate the time frequency domain map 52.

The convolution, pooling and fusing techniques utilized by the spatial domain processing 40 and TF domain processing 42 generally include well-understood convolution neural network (CNN) techniques, and thus are not described in detail herein. Further, the particular type of transform, convolution, pooling and fusion implementations, e.g., kernel size, number of branches, etc., may vary without departing from the intended scope of the invention.

Temporal domain processing 44 processes the input signal 18 to extract specific temporal patterns arising from the nature of the waveform and/or the hardware imperfections. In one approach, the temporal domain processing comprises a recurrent neural network, e.g., a two-layer gated recurrent unit (GRU) with 132 hidden units. The output ($x_o$) from the temporal module is concatenated to the hidden state (h) resulting in a concatenated vector ($x_h$), $x_h$=vec ($x_o$: h), where vec and: are the vectorization and concatenation operator. Specifically, the process adopts a many-to-1 mapping GRU such that it outputs a 1×132 vector instead of a 1024×132 matrix. The hidden state is of dimension 1×132 resulting in a 1×264 concatenated vector.

Temporal domain processing 44 may include a single layer linear feedforward neural network with hyperbolic tangent (tan h) activation and a softmax mapping, which maps the concatenated temporal pattern vector $x_h$ into an attentional scoring vector ($\tau$) as provided by:

$$\tau = \text{softmax}(\tan h(x_h))$$

Here, the softmax function yields an output score from the feed-forward neural network output vector which essentially is the temporal scoring. Intuitively, this scoring accounts for the saliency captured by the temporal feature vector ($x_h$).

The xDom attentional vector ($a_{xdom}$) 60 may be derived by the following operation:

$$a_{xdom} = vec(x_1^{IQ}: x_2^{IQ}: vec(x_3^{phase}: x_4^{mag}): \tau)$$

where $x_1^{IQ}$ represents the spatial domain map 50, $x_2^{IQ}$ represents the time frequency domain map 52, and vec ($x_3^{phase}: x_4^{mag}$): $\tau$ represent the temporal domain map 54. The resulting attentional vector 60 comprehensively captures the essence of the different perturbations present in the RF emissions and can thus be leveraged to perform the relevant fingerprinting classification. The attentional vector 60 is processed by two classifier branches of the multi-task classifier 26 (i.e., task branches), which can comprise simple feedforward neural network layers in which the final output layer performs softmax classification. Here, the two classifier task branches 30, 31 predict a pair of descriptors, i.e., emitter identification and wireless protocol classification.

Figure 3:
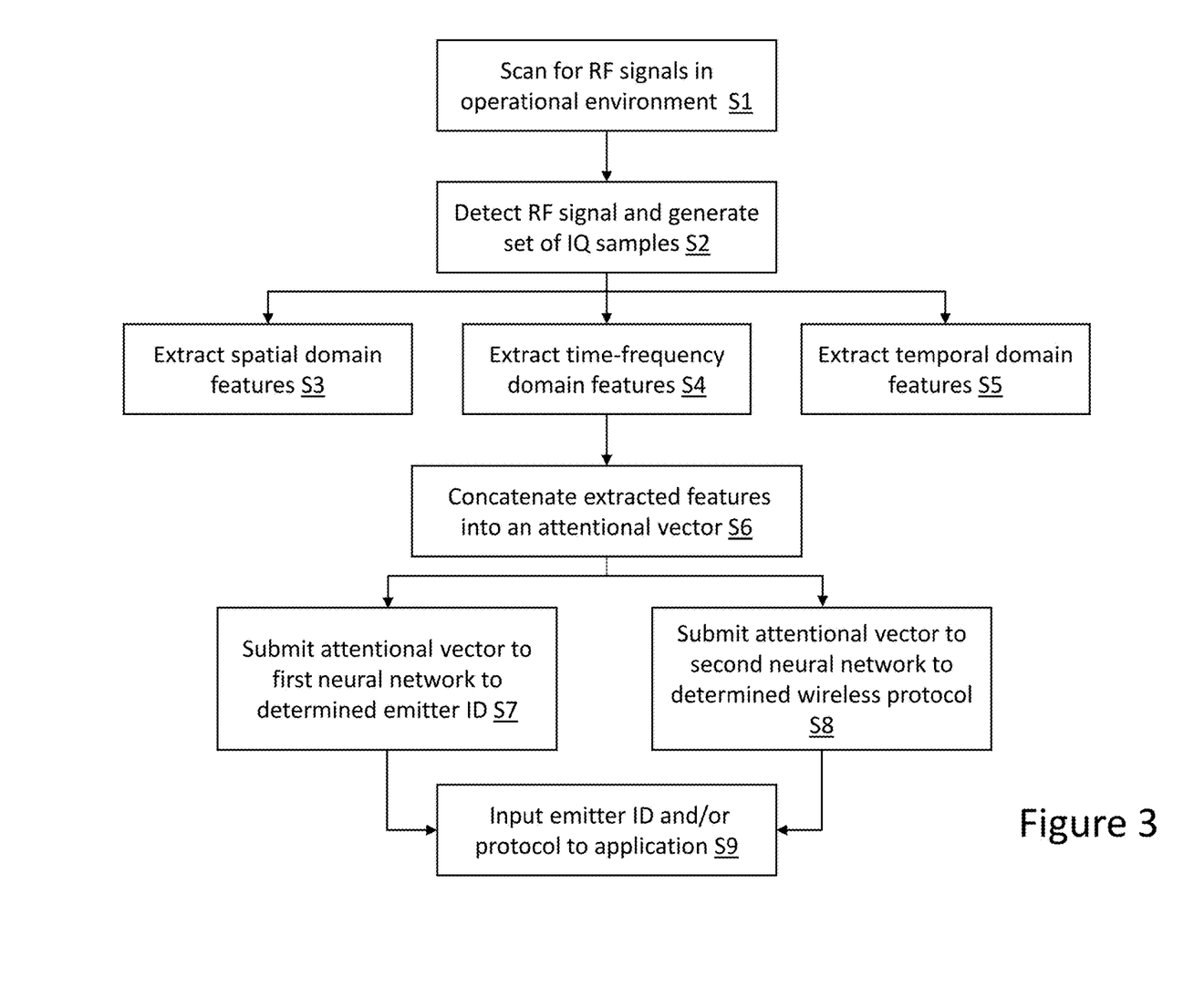
FIG. 3 depicts a flow diagram of a fingerprint method according to embodiments.

FIG. 3 depicts a flow diagram of an illustrative fingerprint method with reference to FIGS. 1 and 2. At S1, the process scans for RF signals in an operational environment 10, e.g., using a receiver system 16 having a spectrum scanner. At S2, a set of IQ samples are generated in response to a detected RF signal, e.g., using the receiver system 16. Next, at S3, S4, S5, spatial domain features, time-frequency domain features, and temporal domain features are extracted from the IQ samples, e.g., using the shared layer 24 of xDom architecture 22. At S6, the extracted features are concatenated into an attentional vector 60. The attentional vector 60 is then submitted to a pair of task branches, e.g., a first neural network at S7 to predict the emitter ID, and to a second neural network at S8 to predict the wireless protocol. The resulting descriptors (i.e., emitter ID and/or protocol) may then be submitted to an application that uses the descriptors to perform some action, e.g., authentication, security, etc.

The present approach does not rely on a priori assumptions on the type of protocol to trace the emitter device origin. Instead, the approach exploits raw unprocessed IQ samples from passive signal reception across diverse wireless protocols. This attentional based approach, which processes spatial, temporal, and time-frequency domains, extracts subtle feature manifestations present in the RF signal emissions to arrive at a comprehensive attentional vector 60, which is robust across the type of emission, time of capture, and other confounding factors.

As noted in FIG. 1, system 20 includes an emitter registration and training system 28. Any technique may be utilized to train the model implemented by xDom architecture 22. In certain approaches, a library of training data may be provided that includes a set of emitter IDs, associated waveforms or signals, and protocols. Training of the model may be done using a single emitter device at a time to allow the model to learn the nuances inherent to the emitter's hardware imperfections.

In more advanced training, once the model has learned several descriptors (e.g., for multiple emitters in one environment), it can be presented with different cases where more than one emitter is present at a time.

In certain cases, system 20 may not recognize an emitter in operational environment 10 during actual operations, i.e., the emitter was never registered and/or used to train the model. In this case, system 20 may raise an alert condition indicating that an unknown emitter is operating in the environment 10 and in some instances offer a registration option for the device.

As also noted, any type of receiver system 16 may be utilized to capture a transmission from an emitter 14$a$, 14$b$, 14$c$. One illustrative device includes a USRP X300 from Ettus Research, which can collect RF signals and generate raw IQ data for system 20. Such a device is capable of scanning and capturing a spectrum, e.g., centered at 2.414 GHz while sampling at a rate of 66.667 MS/s yielding a usable bandwidth of ~66 MHz.

Attention-based neural networks have been used, for instance, in the encoder-decoder architectures of neural machine translation models in natural language processing (NLP). With attention-based systems, each element of the context vector is given relative importance by employing weights allowing the network to learn the most significant portions. Attention is used in embodiments of this disclosure to enable the network to focus and pay attention to the relevant parts of the input signal. The proposed system 20 is the first-time attention has been adapted to solve the RF fingerprinting problem.

Because the deep learning model described herein can perform multiple related tasks as opposed to a single task, it is referred to as a multi-task learning (MTL) model. In contrast to the single task counterparts, the MTL model enjoys several benefits, e.g., a single neural network that can do multiple tasks as opposed to having multiple single task models for each task. MTLs also provide reduced computational and memory requirements. MTLs may also provide reduced training time. For example, if there are two tasks—A and B, with single task models, this would require two models for each task whereas with MTL, it can be achieved with a single neural network consequently reducing the training time by half. MTL models also tend to generalize better as they learn the shared representation from multiple tasks. Extensibility is another key benefit whereby related tasks can be seamlessly included in the MTL architecture.

In embodiments of the disclosure, the attentional MTL architecture can be built from a single task attentional architecture, e.g., as shown in FIG. 2. Such an architecture adopts approximately 90% of the structure of a single task attentional architecture. Here, the classifier modules 26 may serve as the task-specific branches and an additional parallel recurrent layer, i.e., along with shared layer 24, to further improve accuracy. The attention is achieved by processing three domains—spatial, time-frequency, and temporal—of the input signal 18, consequently yielding a cross-domain attentional MTL architecture 20. The cross-domain attentional feature vector 60 is a function of the feature maps from spatial, time-frequency, and temporal domains. Other cross-domain attentional feature vectors for expressing such data than those described herein could alternatively be used (e.g., in a different format and/or with different information included) in further examples.

Experimental data using varying mechanisms in the temporal domain processing 44 have been used to analyze the temporal block's efficacy in capturing the temporal correlation. The table shows a non-limiting example of various temporal fuse operations.

Example Set of Temporal Fuse Operations

| Notation | Temporal fuse type | Operation | (#GRU layers, hidden size) |
|---|---|---|---|
| T1 | Concatenation | $\Gamma([h; o_N])$ | (1, 64) |
| T2 | Bilinear mapping Many to 1 GRU | $\Gamma(\text{Bilinear}([h, o_N]))$ | (1, 64) |
| T3 | Bilinear mapping Many to 2 GRU | $\Gamma(\text{Bilinear}([h, o_{N-1} * o_N]))$ | (1, 64) |
| T4 | Bilinear mapping Many to 2 GRU with Softmax normalization | $\Psi\{\Gamma(\text{Bilinear}([h, o_{N-1} * o_N]))\}$ | (1, 64) |
| T5 | Bilinear mapping Many to 1 GRU with Softmax normalization | $\Psi\{\Gamma(\text{Bilinear}([h, o_N]))\}$ | (1, 128) |
| T6 | Bilinear mapping Many to 1 GRU with Softmax normalization | $\Psi\{\Gamma(\text{Bilinear}([h, o_N]))\}$ | (2, 128) |

Here, $\Gamma(\bullet)$ is the non-linear operation achieved with a single fully connected layer with hyperbolic tangent activation, $\Psi\{\bullet\}$ is the softmax operation, h is the hidden size vector, and $o_N$ is the output of the GRU layers.

Embodiments of system 20 may be deployed in various settings. In some implementations, an Open Neural Network eXchange (ONNX) is suitable to deploy the system 20 on any platform running the ONNX runtime. ONNX is a simple format for structuring metadata and parameters about a model. The ONNX library has tools to read and write ONNX models, make predictions, and draw graphs of the data flow. This exported .onnx file can be executed on CPU or GPU platforms that run the ONNX runtime inference.

In summary, system 20 provides a cross-domain attentional architecture which critically evaluates an incoming waveform within three domains—time/temporal domain, time-frequency domain, and spatial correlations—to extract minute emitter signatures. The architecture achieves two fingerprinting tasks (emitter and protocol identification) with a single neural network model. The RF analysis architecture is protocol agnostic and can be utilized for any desired wireless protocol/signal classes. The RF analysis architecture, furthermore, is an extensible architecture that can accommodate more RF characterizing tasks such as emitter frequency, emitter modulation, among others based on customer's evolving requirements. Owing to the MTL architecture features, the RF analysis architecture has several additional benefits, e.g., reduced training time, reduced model size, improved generalization, and extensibility.

Various aspects of the RF analysis architecture in embodiments of the disclosure provide additional benefits. For instance, the RF analysis architecture is scalable to accommodate more device fingerprinting capability. It may also produce decisions based on a 15.3 microsecond (μs) length waveform snapshot. Various embodiments of the disclosure are hardware agnostic and can be interfaced with any radio hardware that can provide raw IQ sample stream to the neural network. Such embodiments may support multi-platform deployment capability and can be deployed on CPUs thereby alleviating strong computational requirements as with a GPU. The RF analysis architecture yields robust prediction corresponding to the emitter ID and emitter wireless protocol.

Figure 4:
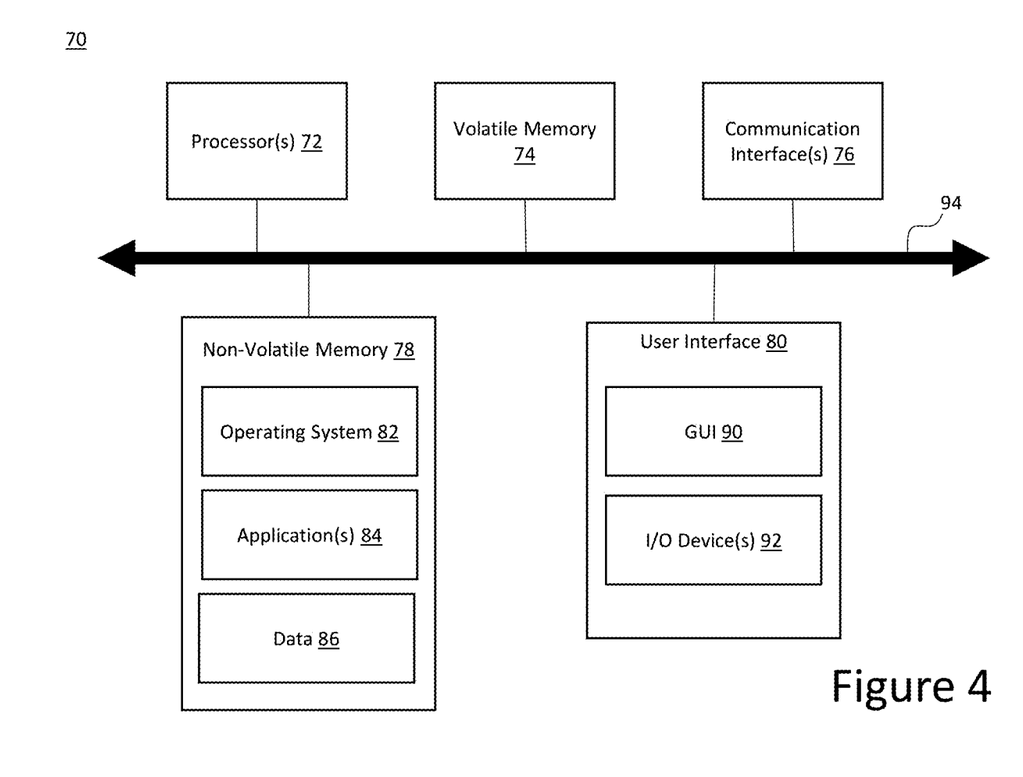
FIG. 4 depicts an illustrative computing system according to embodiments.

Elements of the described solution may be embodied in a computing system, such as that shown in FIG. 4 in which a computing device 70 may include one or more processors 72, volatile memory 74 (e.g., RAM), non-volatile memory 78 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 80, one or more communications interfaces 76, and communication bus 74. User interface 80 may include graphical user interface (GUI) 90 (e.g., a touchscreen, a display, etc.) and one or more input/output (I/O) devices 92 (e.g., a mouse, a keyboard, etc.). Non-volatile memory 78 stores operating system 82, one or more applications 84, and data 86 such that, for example, computer instructions of operating system 82 and/or applications 84 are executed by processor(s) 72 out of volatile memory 74. Data may be entered using an input device of GUI 90 or received from I/O device(s) 92. Various elements of computer 70 may communicate via communication bus 94. Computer 70 as shown in FIG. 4 is shown merely as an example, as clients, servers and/or appliances and may be implemented by any computing or processing environment and with any type of machine or set of machines that may have suitable hardware and/or software capable of operating as described herein.

Processor(s) 72 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. Communications interfaces 56 may include one or more interfaces to enable computer 300 to access a computer network such as a LAN, a WAN, or the Internet through a variety of wired and/or wireless or cellular connections.

In described embodiments, a first computing device 70 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

What is claimed is:

1. A method comprising:
   obtaining an input signal associated with a radio frequency (RF) transmission;
   separately extracting spatial domain features, time-frequency domain features, and temporal domain features from the input signal;
   processing the spatial domain features, time-frequency domain features, and temporal domain features to generate an attentional vector; and
   predicting at least one descriptor for an emitter of the RF transmission based on the attentional vector.

2. The method of claim 1, wherein the at least one descriptor includes an emitter identification and a communication protocol of the RF transmission.

3. The method of claim 1, wherein the input signal comprises a set of IQ samples.

4. The method of claim 3, wherein the spatial domain features are extracted with a pair of parallel one-dimensional convolution processes that operate on the set of IQ samples.

5. The method of claim 3, wherein the time-frequency domain features are extracted with:
   a time-frequency transformation that converts the IQ samples to a two-dimensional time-frequency map; and
   a parallel two-dimensional convolutional bank that operates on the time-frequency map.

6. The method of claim 3, wherein the time-frequency domain features are extracted with:
   a recurrent neural network that generates a concatenated vector from the IQ samples; and
   a linear feedforward neural network that operates on the concatenated vector.

7. The method of claim 3, wherein the set of IQ samples comprises 1024 samples.

8. The method of claim 1, wherein predicting the at least one descriptor includes inputting the attentional vector into a first task branch of a multi-task architecture to generate the identification of the emitter and inputting the attentional vector into a second branch of the multi-task architecture to generate the protocol used by the emitter.

9. A system comprising:
   a memory; and
   a processor configured to identify a fingerprint of an RF transmission according to a process that includes:
      obtaining an input signal associated with the RF transmission;
      separately extracting spatial domain features, time-frequency domain features, and temporal domain features from the input signal;
      processing the spatial domain features, time-frequency domain features, and temporal domain features to generate an attentional vector; and
      predicting at least one descriptor for an emitter of the RF transmission based on the attentional vector.

10. The system of claim 9, wherein the at least one descriptor includes an emitter identification and a communication protocol of the RF transmission.

11. The system of claim 9, wherein the input signal comprises a set of IQ samples.

12. The system of claim 11, wherein the spatial domain features are extracted with a pair of parallel one-dimensional convolution processes that operate on the set of IQ samples.

13. The system of claim 11, wherein the time-frequency domain features are extracted with:
    a time-frequency transformation that converts the IQ samples to a two-dimensional time-frequency map; and
    a parallel two-dimensional convolutional bank that operates on the time-frequency map.

14. The system of claim 11, wherein the time-frequency domain features are extracted with:
    a recurrent neural network that generates a concatenated vector from the IQ samples; and
    a linear feedforward neural network that operates on the concatenated vector.

15. The system of claim 9, wherein predicting the at least one descriptor includes inputting the attentional vector into a first task branch of a multi-task architecture to generate the identification of the emitter and inputting the attentional vector into a second branch of the multi-task architecture to generate the protocol used by the emitter.

16. A system comprising:
    a sensor configured to capture radio frequency RF transmissions having different communication protocols from a set of emitters in an operational environment and generating a set of IQ samples for a particular RF transmission; and a computing device having a memory and a processor configured to identify a fingerprint of the RF transmission according to a process that includes:

separately extracting spatial domain features, time-frequency domain features, and temporal domain features from the set of IQ samples;

processing the spatial domain features, time-frequency domain features, and temporal domain features to generate an attentional vector; and identifying the emitter of the particular RF transmission by submitting the attentional vector to a neural network.

17. The system of claim 16, further comprising identifying the protocol of the particular RF transmission by submitting the attentional vector to a further neural network.

18. The system of claim 16, wherein the spatial domain features are extracted with a pair of parallel one-dimensional convolution processes that operate on the set of IQ samples.

19. The system of claim 16, wherein the time-frequency domain features are extracted with:

a time-frequency transformation that converts the IQ samples to a two-dimensional time-frequency map; and a parallel two-dimensional convolutional bank that operates on the time-frequency map.

20. The system of claim 16, wherein the time-frequency domain features are extracted with:

a recurrent neural network that generates a concatenated vector from the IQ samples; and a linear feedforward neural network that operates on the concatenated vector.

* * * * *